(12) United States Patent
Chen

(10) Patent No.: US 10,363,565 B2
(45) Date of Patent: Jul. 30, 2019

(54) PORTABLE CYCLONE DUST SEPARATOR AND CORRESPONDING DEDUSTING SYSTEM

(71) Applicant: Bosch Power Tools (China) Co. Ltd., Hangzhou, Zhejiang (CN)

(72) Inventor: Feng Chen, Hangzhou (CN)

(73) Assignee: BOSCH POWER TOOLS (CHINA) CO. LTD., Hangzhou (CN)

( * ) Notice: Subject to any disclaimer, the term of this patent is extended or adjusted under 35 U.S.C. 154(b) by 177 days.

(21) Appl. No.: 15/396,773

(22) Filed: Jan. 2, 2017

(65) Prior Publication Data
US 2017/0189917 A1 Jul. 6, 2017

(30) Foreign Application Priority Data
Dec. 31, 2015 (CN) .......................... 2015 1 1031635

(51) Int. Cl.
*B04C 3/04* (2006.01)
*B01D 45/12* (2006.01)
(Continued)

(52) U.S. Cl.
CPC ........ *B04C 3/04* (2013.01); *A47L 5/24* (2013.01); *A47L 9/165* (2013.01); *A47L 9/1608* (2013.01);
(Continued)

(58) Field of Classification Search
CPC .... B01D 45/08; B01D 45/12; A47L 5/24; A47L 9/1608; A47L 9/1625;
(Continued)

(56) References Cited

U.S. PATENT DOCUMENTS

| | | | | |
|---|---|---|---|---|
| 5,135,552 A | * | 8/1992 | Weistra ................ | A47L 9/1625 55/337 |
| 6,840,972 B1 | * | 1/2005 | Kim .................... | A47L 9/1625 55/337 |

(Continued)

FOREIGN PATENT DOCUMENTS

CN          203468515 U        3/2014

*Primary Examiner* — Jason M Greene
(74) *Attorney, Agent, or Firm* — Norton Rose Fulbright US LLP

(57) ABSTRACT

The present invention discloses a portable cyclone dust separator, which comprises a first stage cyclone separation unit having an intake for suctioning air to be dedusted, the air suctioned through the intake rotating around a first rotational axis in the first stage cyclone separation unit; and a second stage cyclone separation unit having an air inlet, the air inlet being configured to be adapted to suction the air, which needs to be dedusted secondarily by the second stage cyclone separation unit, from the first stage cyclone separation unit, the air suctioned through the air inlet rotating around at least one second rotational axis in the second stage cyclone separation unit, wherein the first rotational axis is disposed to be nonparallel to the second rotational axis. The present invention also discloses a dedusting system comprising such a portable cyclone dust separator. The portable cyclone dust separator of the present invention is fit for the operating orientations within the greater angular range.

11 Claims, 7 Drawing Sheets

(51) Int. Cl.
*A47L 5/24* (2006.01)
*A47L 9/16* (2006.01)
*B04C 5/04* (2006.01)
*B04C 5/185* (2006.01)
*B04C 5/26* (2006.01)
*B04C 5/02* (2006.01)
*B04C 9/00* (2006.01)

(52) U.S. Cl.
CPC ............ *A47L 9/1625* (2013.01); *A47L 9/1641* (2013.01); *B01D 45/12* (2013.01); *B04C 5/02* (2013.01); *B04C 5/04* (2013.01); *B04C 5/185* (2013.01); *B04C 5/26* (2013.01); *B04C 2009/002* (2013.01)

(58) Field of Classification Search
CPC ......... A47L 9/1641; A47L 9/165; B04C 3/04; B04C 5/04; B04C 5/26
See application file for complete search history.

(56) References Cited

U.S. PATENT DOCUMENTS

| | | | | |
|---|---|---|---|---|
| 2005/0252179 | A1* | 11/2005 | Oh | A47L 9/1625 55/337 |
| 2007/0294856 | A1* | 12/2007 | Park | A47L 9/1625 15/347 |
| 2008/0190080 | A1* | 8/2008 | Oh | A47L 9/1625 55/343 |
| 2009/0320421 | A1* | 12/2009 | Qian | A47L 9/1625 55/441 |
| 2015/0216383 | A1* | 8/2015 | Bower | A47L 9/1608 55/322 |
| 2015/0257618 | A1* | 9/2015 | Bassett | A47L 9/1641 15/353 |
| 2015/0305583 | A1* | 10/2015 | Jonsson | B04C 5/04 55/320 |
| 2018/0000302 | A1* | 1/2018 | Hyun | A47L 9/1625 |

\* cited by examiner

PORTABLE CYCLONE DUST SEPARATOR AND CORRESPONDING DEDUSTING SYSTEM

CROSS-REFERENCE TO RELATED APPLICATIONS

This application claims the benefit of Chinese Patent Application No. 201511031635.9, filed Dec. 31, 2015, the entire disclosure of which is herein incorporated by reference in its entirety.

FIELD OF THE INVENTION

The present invention relates to a portable cyclone dust separator and a dedusting system comprising such a portable cyclone dust separator.

BACKGROUND OF THE INVENTION

The cyclone dust separator is a type of latest vacuum cleaner, which is free of a conventional dust collecting bag and filter system, but causes the air flow to flow through one or more cylinders along a high-speed spiral path. When the air flow makes the rapid movement along the spiral path, dust and particles will be thrown out of the air flow due to the strong centrifugal force. In this way, there is no need to use any kind of filter for separating dust from the air flow, with dust being collected at the bottom of the cylinder.

Relative to the conventional vacuum cleaner, the cyclone dust separator has the notable advantages. There is no need to replace the dust collecting bag, and the suction force will not weaken with increase of the garbage. Thus, the cyclone dust separator has been widely used at present.

To further enhance the dust removal effect, the cyclone dust separator normally comprises a multistage cyclone dust separator. Currently, the two-stage cyclone dust separator is popular thanks to its simple and compact structure and low cost.

The Chinese patent CN203468515U discloses a typical two-stage cyclone dust separator. In this two-stage cyclone dust separator, the outer air inlet is tangential to the housing of the first stage dust separation unit, and the inner cyclonic conical drum acting as the second stage dust separation unit is arranged coaxially with the housing of the first stage dust separation unit. Most of the dust can be separated from the air and falls onto the bottom of the first stage dust separation unit. Only a small part of the unseparated dust enters the inner cyclonic conical drum, and then is separated by the inner cyclonic conical drum and falls onto its bottom.

Such typical two-stage cyclone dust separator is designed as floor type, and is normally placed on the horizontal floor, wherein the axis of the inner cyclonic conical drum is in a vertical state, and the user just needs to control the suction port at the end of the extension tube, so as to better carry out the dust removal operations. Therefor, the dust suction devices having the similar two-stage cyclone separator all are configured to be vertically disposed for operation.

However, if the angle of the cyclonic conical drum of the two-stage cyclone dust separator is frequently changed or adjusted, even in the horizontal direction, at least two problems will be encountered: firstly, all the dust rotates always in the first stage dust separation unit, and secondly, only a limited part of the dust may accumulate on the bottom of the dust suction device.

The above problems will result in that a great deal of dust is suctioned into the inner cyclonic conical drum or air outlet unit, thereby blocking the filter at the outlet in short time. Here, the separating efficiency and performance of the dust suction device will be lowered to a very low level. Thus, it is difficult to operate the conventional two-stage cyclone dust separator in the horizontal orientation, limiting the operation by the user.

Thus, it is urgent to make an improvement to such a two-stage cyclone dust separator, so as to enable it to be operated both in the vertical orientation and in a certain angle range offset from the vertical orientation, even in the horizontal orientation.

SUMMARY OF THE INVENTION

One object of the present invention is to provide an improved dust suction device that can overcome the above disadvantages, as well as a dedusting system comprising the dust suction device.

According to the first aspect of the present invention, a portable cyclone dust separator is provided, which comprises: a first stage cyclone separation unit having an intake for suctioning air to be dedusted, the air suctioned through the intake rotating around a first rotational axis in the first stage cyclone separation unit; and a second stage cyclone separation unit having an air inlet, the air inlet being configured to be adapted to suction the air, which needs to be dedusted secondarily by the second stage cyclone separation unit, from the first stage cyclone separation unit, the air suctioned through the air inlet rotating around at least one second rotational axis in the second stage cyclone separation unit, wherein the first rotational axis is disposed to be nonparallel to the second rotational axis.

According to one alternative embodiment, the angle included by the first rotational axis and the second rotational axis ranges from 60° to 90°; and/or the second stage cyclone separation unit is disposed within the first stage cyclone separation unit, or the second stage cyclone separation unit is disposed at least partially outside the first stage cyclone separation unit.

According to one alternative embodiment, the first stage cyclone separation unit has a first stage cyclone structure, the intake is configured to be adapted to tangentially direct the air to be dedusted into the first stage cyclone structure; and/or the second stage cyclone separation unit has at least one second stage cyclone structure.

According to one alternative embodiment, the second stage cyclone separation unit has at least one second stage cyclone cylinder, the larger end of which is connected to the corresponding second stage cyclone structure, the second stage cyclone structure is configured to be adapted to generate rotating airflow in the corresponding second stage cyclone cylinder; and/or a prefilter is arranged in the intake.

According to one alternative embodiment, the first stage cyclone separation unit further comprises a first dust collection chamber connected to the first stage cyclone structure; and/or the second stage cyclone separation unit further comprises an air outlet unit that coaxially extends into the second stage cyclone structure; and/or the intake is a suction tube; and/or one end of the air inlet has an axial opening adapted to suction the air.

According to one alternative embodiment, the end of the second stage cyclone structure away from the second stage cyclone cylinder is covered by a lid, a central hole is disposed at the center of the lid, and the air outlet unit passes through the central hole into the second stage cyclone structure.

According to one alternative embodiment, the first stage cyclone separation unit and the second stage cyclone separation unit are at least partially embodied by a structure body having an air inlet, a first housing, a second housing, a two-stage separation cylinder structure and a dust collection chamber lid, wherein in the assembled state, the first housing is connected to the second housing, the two-stage separation cylinder structure is fixed in the second housing, the structure body is secured to the first housing such that the air inlet extends into the two-stage separation cylinder structure, and the dust collection chamber lid is detachably connected to the second housing.

According to one alternative embodiment, the two-stage separation cylinder structure has a first cyclonic conical drum, a second cyclonic conical drum and a chamber body, wherein the first cyclonic conical drum runs generally parallel to the second cyclonic conical drum, the larger ends of the first cyclonic conical drum and the second cyclonic conical drum both communicate with the chamber body, the smaller ends of the first cyclonic conical drum and the second cyclonic conical drum both extend into a second dust collection chamber in the assembled state, the chamber body comprises a first partial cylinder and a second partial cylinder, a junction between the first partial cylinder and the second partial cylinder is provided with an interface leading to the interior of the chamber body, which interface is in the assembled state in communication with the air inlet such that the air can be tangentially guided into the first cyclonic conical drum and the second cyclonic conical drum simultaneously; and/or the structure body is further provided with a sealing cap attached to the air inlet, the first housing is provided with a first stage cyclone cylinder that is opened at both ends, in the assembled state the first end of the first stage cyclone cylinder is closed by the sealing cap, and the second end of the first stage cyclone cylinder opposite the first end sealingly abuts against a corresponding place of the second housing and is in communication with an inner chamber of the second housing; and/or the intake comprises a first portion arranged on the first housing and a second portion arranged on the second housing and mating with the first portion; and/or the second housing has a first open mouth and a second open mouth opposite the first open mouth, the dust collection chamber lid is detachably connected to the first open mouth and closes the first open mouth, the two-stage separation cylinder structure is fitted into the second housing through the second open mouth; and/or the two stage separation cylinder structure is provided with a support which is adapted to at least auxiliary fix the two-stage separation cylinder stably in the second housing; and/or the second housing acts as the first dust collection chamber of the first stage cyclone separation unit, and is configured to allow removal of the dust in the second housing by detaching the dust collection chamber lid; and/or at least two of the structure body, the first housing, the second housing, the two-stage separation cylinder structure and the dust collection chamber lid are assembled together in a snap-fit connecting mode.

According to one alternative embodiment, the air inlet is configured to be tubular and is provided, at the position adjacent to the sealing cap, with a plurality of air-in holes distributed about the circumference; and/or the first stage cyclone cylinder is cylindrical; and/or the air inlet is arranged concentrically with the first stage cyclone cylinder; and/or the first open mouth is smaller than the second open mouth.

According to the second aspect of the present invention, a portable cyclone dust separator is provided, which comprises: a first stage cyclone separation unit having an intake for suctioning air to be dedusted, a first stage cyclone cylinder for causing the air suctioned through the intake to rotate around a first rotational axis, and a first dust collection chamber for collecting dust separated by the first stage cyclone cylinder; and a second stage cyclone separation unit having an air inlet for suctioning the air that needs to be dedusted secondarily from the first stage cyclone separation unit, a second stage cyclone cylinder for causing the air suctioned through the air inlet to rotate around a second rotational axis, and a second dust collection chamber for collecting dust separated by the second stage cyclone cylinder, wherein the first rotational axis is disposed to be nonparallel to the second rotational axis.

According to one alternative embodiment, the angle included by the first rotational axis and the second rotational axis ranges from 60° to 90°.

According to one alternative embodiment, the second stage cyclone cylinder is received within the first dust collection chamber, and the air inlet is in communication with the second stage cyclone cylinder and extends to the middle of the first stage cyclone cylinder.

According to one alternative embodiment, both the air inlet and the first stage cyclone cylinder are cylindrical and are concentrically arranged.

According to one alternative embodiment, the portable cyclone dust separator further comprises a dust collection chamber lid adapted to open and close the first dust collection chamber and the second dust collection chamber simultaneously.

According to one alternative embodiment, the portable cyclone dust separator comprises an opening that is opened in the direction of the first rotational axis and an open mouth that opens in the direction of the second rotational axis, the second stage cyclone cylinder is fitted into the portable cyclone dust separator from the open mouth, and the air inlet is fitted into the portable cyclone dust separator from the opening and communicates with the second stage cyclone cylinder.

According to one alternative embodiment, the second stage cyclone separation unit has at least two second stage cyclone cylinders that are parallel to each other and communicate with the air inlet.

According to the third aspect of the present invention, a dedusting system is provided, wherein the dedusting system comprises the at least one portable cyclone dust separator.

The portable cyclone dust separator of the present invention is suitable for the operational orientations within the greater angular range, so as to ensure the consistent high working efficiency and persistent normal working duration.

BRIEF DESCRIPTION OF THE DRAWINGS

The basic principles, characteristics and advantageous of the present invention can be better understood hereinafter by illustrating the present invention in more details with reference to the drawings. The drawings include.

DETAILED DESCRIPTION OF THE INVENTION

To make clear the technical problem addressed by the present invention, the technical solutions and the advantageous technical effects, the present invention is described in more details hereinafter by making reference to the drawings and examples. It should be appreciated that the specific examples just function to explain the present invention, without limiting the extent of protection of the present invention.

Figure 1:
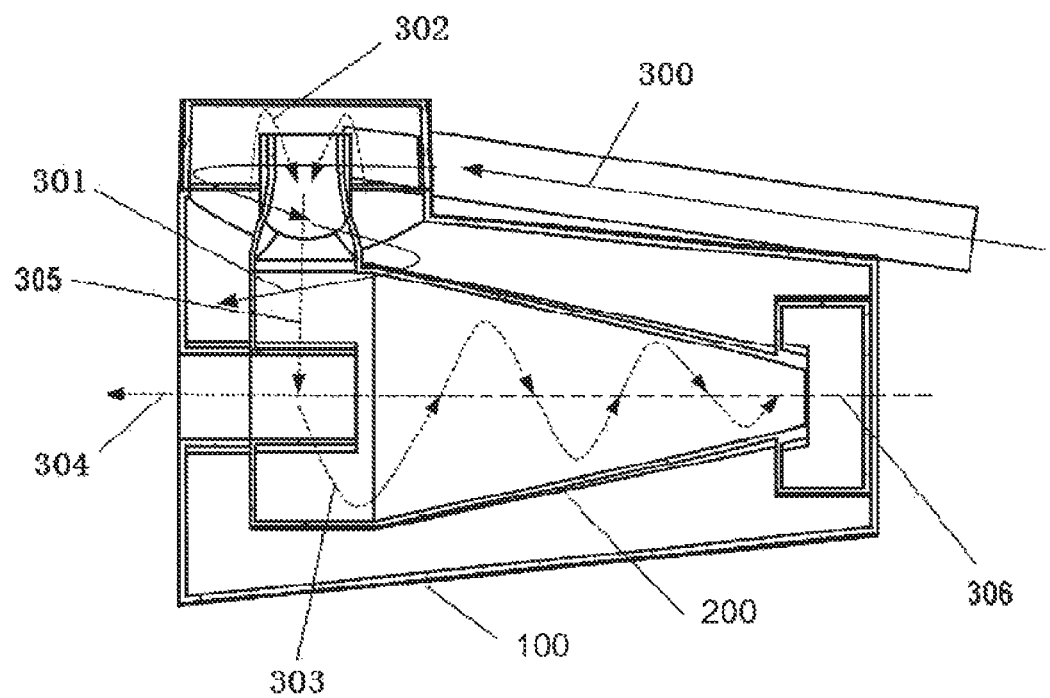
FIG. 1 is a schematic view of the longitudinal section of a two-stage cyclone dust separator according to one alternative exemplary embodiment of the present invention, showing the travelling path of the airflow.

FIG. 1 is a schematic view of the longitudinal section of a two-stage cyclone dust separator according to one alternative exemplary example of the present invention, showing the running path of the airflow. For one skilled in the art, the two-stage cyclone dust separator obviously may be one single operating device per se, or may be one part of the dust removal system. Hereinafter, it is described as one single operating device.

As shown in FIG. 1, the two-stage cyclone dust separator comprises a first stage cyclone separation unit 100 and a second stage cyclone separation unit 200, wherein air 300 with dust rotates in the first stage cyclone separation unit 100 as a first rotating airflow 301, part air 302 with fewer and smaller dust enters the second stage cyclone separation unit 200 and then rotates in the second stage cyclone separation unit 200 as a second rotating airflow 303 so as to separate the dust therefrom, and air 304 from which the dust is separated is discharged from the two-stage cyclone dust separator. The first rotating airflow 301 rotates around a first rotational axis 305, and the second rotating airflow 303 rotates around a second rotational axis 306.

Figure 2:
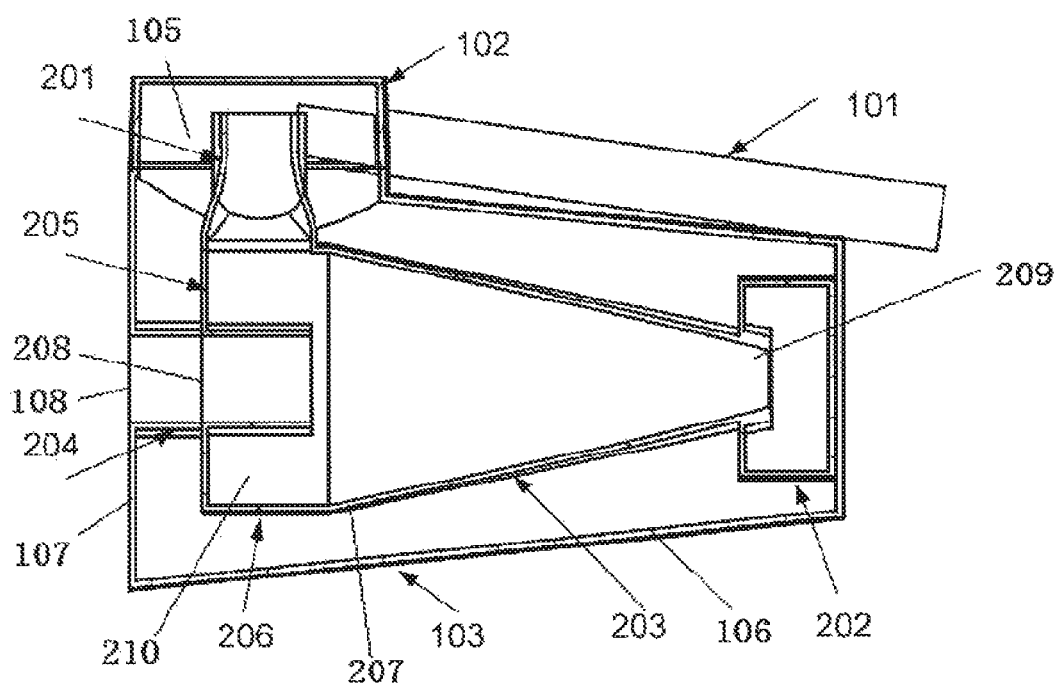
FIG. 2 is a structural schematic view of the two-stage cyclone dust separator shown in FIG. 1.

FIG. 2 is a structural schematic view of the two-stage cyclone dust separator. As shown in FIG. 2, the first stage cyclone separation unit 100 mainly comprises an intake passage 101, a first stage cyclone cylinder 102 communicating with the intake passage 101, and a first dust collection chamber 103 (may be a dust box in the example) connected to the first stage cyclone cylinder 102. The intake passage 101 preferably is tubular and is used for suctioning the air to be dedusted. The first dust collection chamber 103 is used for collecting the dust separated by the first stage cyclone separation unit 100.

The second stage cyclone separation unit 200 mainly comprises an air inlet 201, a second dust collection chamber 202, a second stage cyclone cylinder 203, an air outlet unit 204, a lid 205 and a chamber body 206.

Figure 3:
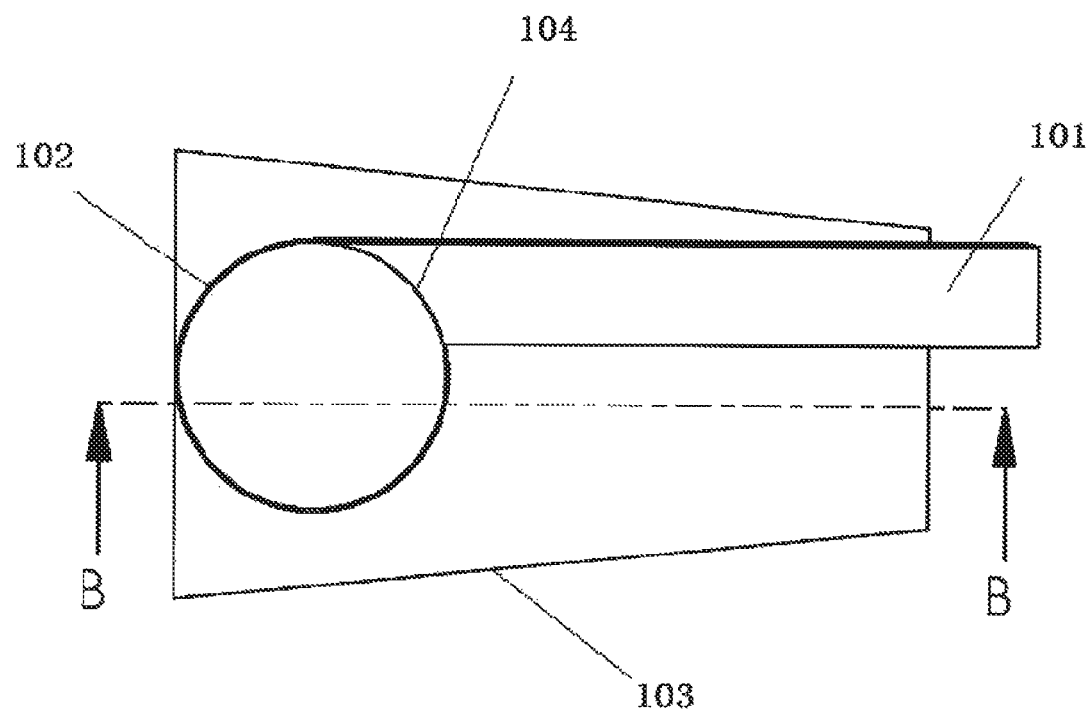
FIG. 3 is a schematic view of the two-stage cyclone dust separator shown in FIG. 2 viewed from above.

FIG. 3 is a schematic view of the two-stage cyclone dust separator shown in FIG. 2 viewed from above. FIGS. 1 and 2 both are the sectional views made along the cutting line B-B in FIG. 3. As shown in FIG. 3, the intake passage 101 communicates with the first stage cyclone cylinder 102 through a tangential intake port 104 so as to tangentially direct the air with duct that needs to be cleaned into the first stage cyclone cylinder 102, so that the air can rotate at high speed within the first stage cyclone cylinder 102. One end of the first stage cyclone cylinder 102 is a closed end, while the other end is connected to the first dust collection chamber 103.

According to one preferred exemplary example, the air inlet 201 of the second stage cyclone separation unit 200 is cylindrical and arranged generally coaxially with the first stage cyclone cylinder 102. In order to enable the part air 302 to enter the second stage cyclone separation unit 200 through the air inlet 201, the upper end of the air inlet 201 is opened and is spaced apart from the closed end of the first stage cyclone cylinder 102 by a certain distance, as illustrated in FIG. 2. For one skilled in the art, the air inlet 201 should be configured to be adapted to take in the air with fewer and finer dust, and the air at the position shown in FIG. 2 contains the relatively fewer and relatively finer dust.

According to another preferred exemplary example, the upper end of the air inlet 201 also may be closed, while at least one air-in hole is formed on the peripheral edge of the air inlet 201, so as to direct the part air 302 into the second stage cyclone separation unit 200 through the air-in hole. Here, the upper end of the air inlet 201 may extend to the closed end of the first stage cyclone cylinder 102.

Certainly, for one skilled in the art, the air inlet 201 may have a combination of the above two modes, i.e., both the upper end and the peripheral edge of the air inlet 201 may be provided with the air-in hole.

In order to enable the part air 302 that enters through the air inlet 201 to rotate within the chamber body 206 at high speed, the air inlet 201, similar to the intake passage 101, is in communication with the chamber body 206 through the corresponding tangential intake port, so as to tangentially direct the air into the chamber body 206 for achieving the high-speed rotation. The chamber body 206 preferably is cylindrical.

The first stage cyclone cylinder 102 and the air inlet 201 delimit a first stage cyclone chamber 105. When the air that needs to be dedusted enters tangentially the first stage cyclone chamber 105 through the tangential intake port 104 of the intake passage 101, the high-speed rotation will occur so that the most dust will fall into the first dust collection chamber 103, especially onto the bottom 106 of the first dust collection chamber 103, under the action of the centrifugal force and gravity.

As shown in FIG. 2, one end of the chamber body 206 is connected to the lid 205 or is formed integrally with the lid 205, and the other end thereof is connected to the greater end 207 of the second stage cyclone cylinder 203. The lid 205 preferably has a hole 208 at its center, so that the hole 208 is generally concentric with the chamber body 206. The smaller end 209 of the second stage cyclone cylinder 203 extends into the second dust collection chamber 202 so as to collect the dust separated by the second stage cyclone cylinder 203.

According to one exemplary example, the second stage cyclone cylinder 203 also can be formed integrally with the chamber body 206.

The sidewall 107 of the first dust collection chamber 103 is provided thereon with a hole 108 that is aligned with the hole 208. One end of the air outlet unit 204 is inserted through the hole 108, and then into the chamber body 206 through the hole 208 of the lid 205, so as to be substantially concentric with the chamber body 206. The other end of the air outlet unit 204 extends beyond the first dust collection chamber 103 to be connected to a negative pressure generator.

Preferably, in the assembled state, the air outlet unit 204 does not extend into the second stage cyclone cylinder 203.

The chamber body 206 and the portion of the air outlet unit 204 extending into the chamber body 206 collectively delimit a second stage cyclone chamber 210. When the part air 302 tangentially enters the second stage cyclone chamber 210 through the air inlet 201, the high-speed rotation will occur. Then the air that rotates at high speed will rotarily enter the second stage cyclone cylinder 203 and travel towards the smaller end 209 of the second stage cyclone cylinder 203, thereby enabling the dust to be separated by the centrifugal force and collected in the second dust collection chamber 202.

A filter such as filter cotton may be provided in the air outlet unit 204 to further filter the discharged air.

According to one exemplary example, a prefilter such as a dust baffle may be provided in the intake passage 101 to remove the dust preliminarily.

Figure 4:
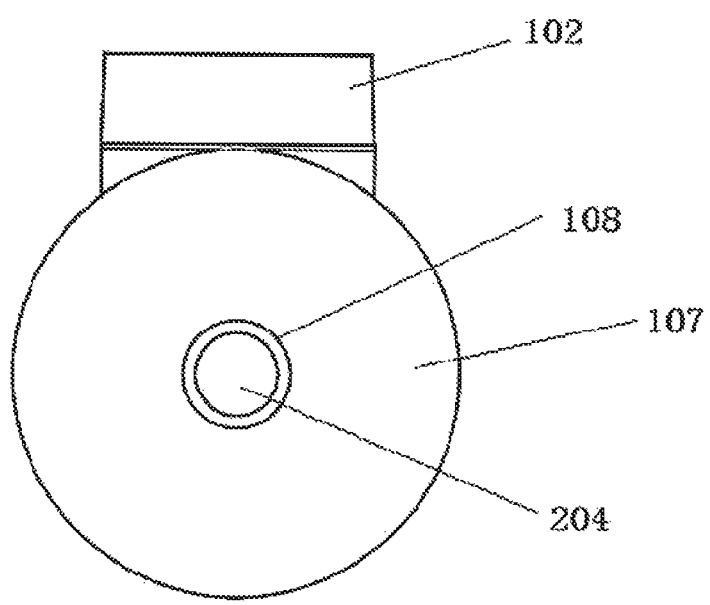
FIG. 4 is a schematic view of the two-stage cyclone dust separator shown in FIG. 2 viewed from the left side.

FIG. 4 is a schematic view of the two-stage cyclone dust separator shown in FIG. 2 viewed from the left side. The hole 108 and the air outlet unit 204 can be viewed more intuitively from FIG. 4.

For one skilled in the art, obviously it is advantageous that the first dust collection chamber 103 is detachably connected to the first stage cyclone cylinder 102, such as snap-fit connection, and this facilitates opening of the first dust collection chamber 103 for dumping the collected dust.

Moreover, a special mechanism for dumping the dust may be provided on the first dust collection chamber 103, such as on the bottom 106 of the first dust collection chamber 103.

For one skilled in the art, obviously it also is advantageous that the second dust collection chamber 202 is detachably mounted, so that the second dust collection chamber 202 can be conveniently cleaned.

In addition, for one skilled in the art, the first dust collection chamber 103 may be formed by assembling a plurality of components, or integrally formed.

The two-stage cyclone dust separator as described above is not only fit for the operation in the operating orientation shown in FIGS. 1 and 2, but also can work in an efficient manner when the said two-stage cyclone dust separator is inclined by a certain angle relative to the orientation shown in FIGS. 1 and 2. The two-stage cyclone dust separator also can work efficiently even when it is inclined by 90° in relation to the orientation shown in FIGS. 1 and 2.

However, it should be indicated that the structural layout of the two-stage cyclone dust separator shown in FIGS. 1 to 4 just is exemplary, and does not serve as a limit to the actual structural layout of the two-stage cyclone dust separator. For example, the intake passage 101 may be omitted, but only the tangential intake port 104 is drilled on the first stage cyclone cylinder 102. Similarly, even the air inlet 201 may be omitted, but a corresponding tangential intake port is only drilled on the chamber body 206.

Furthermore, it is possible to change the positional relations between one or more components of the first stage cyclone separation unit 100 and one or more components of the second stage cyclone separation unit 200. For example, the second dust collection chamber 202, the second stage cyclone cylinder 203, the air outlet unit 204, the lid 205 and the chamber body 206 of the second stage cyclone separation unit 200 may be at least partially arranged outside the first dust collection chamber 103 of the first stage cyclone separation unit 100, so long as the part air 302 containing the fewer and finer dust can be tangentially directed into the chamber body 206 of the second stage cyclone separation unit 200.

Furthermore, the second stage cyclone separation unit also can comprise a plurality of second stage cyclone cylinders that are in parallel connected to the chamber body, so that the air that has been directed into the chamber body can be branched and directed into the individual second stage cyclone cylinders for carrying out the rotating separation of the dust. Here, the shape of the chamber body and the arrangement of the air inlet relative to the chamber body should be adapted to form rotary airflow at the respective positions of the chamber body corresponding to the second stage cyclone cylinders, so as to generate rotary airflow capable of entering the respective cyclone cylinders. It is apparent that a plurality of chamber bodies also can be used, each of which corresponds to one or more second stage cyclone cylinders, and in this case the air inlet should introduce the satisfactory airflow into the respective chamber bodies.

Figure 5:
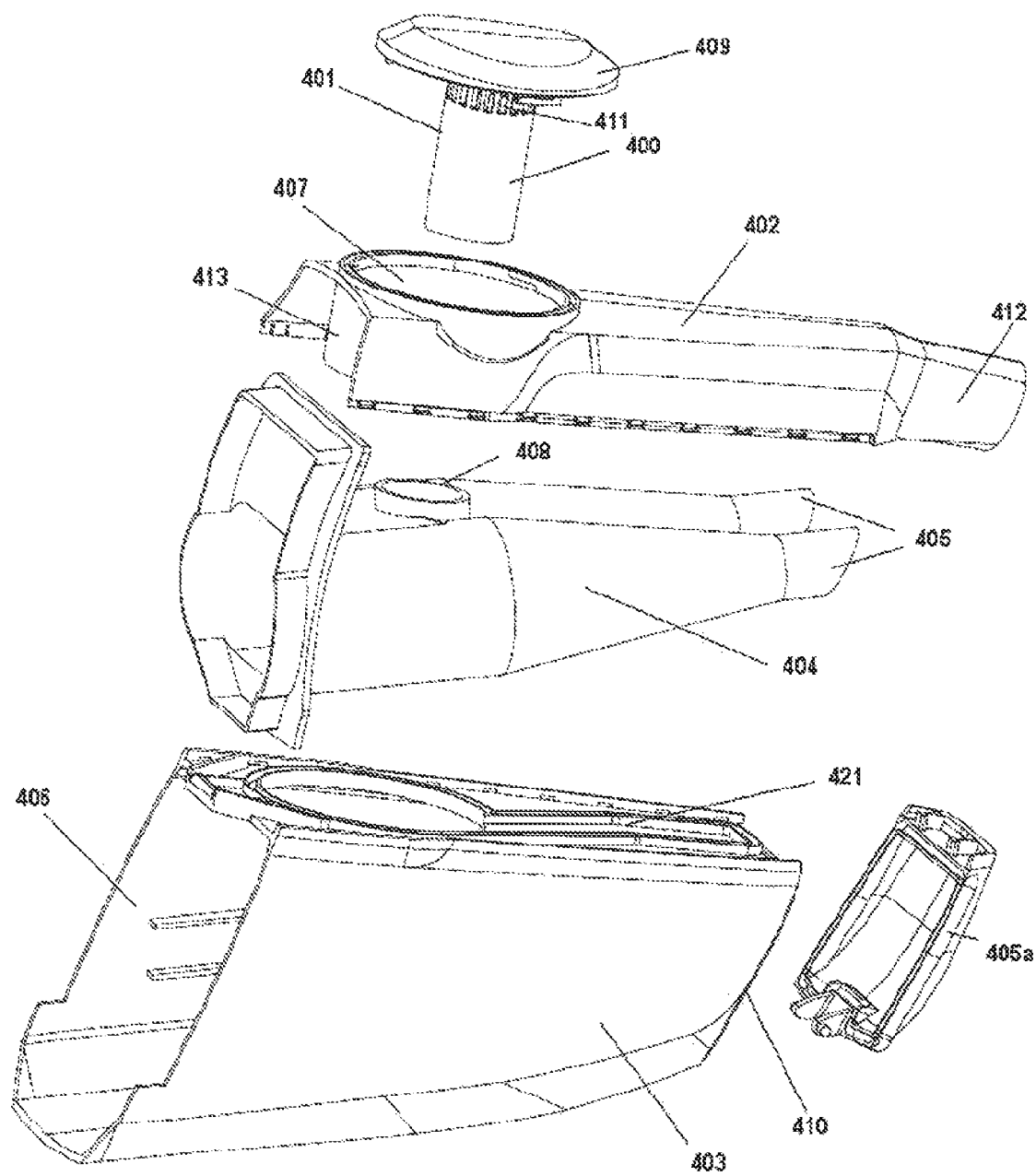
FIG. 5 is a three-dimensional exploded view of a two-stage cyclone dust separator having two second stage cyclone cylinders according to a further alternative exemplary embodiment of the present invention.

FIG. 5 is a three-dimensional exploded view of a portable cyclone dust separator having two second stage cyclone cylinders according to a further alternative exemplary embodiment of the present invention.

As shown in FIG. 5, the portable cyclone dust separator mainly comprises a structure body 401 having an air inlet 400, a first housing 402, a second housing 403 having the function of the first dust collection chamber, a two-stage separation cylinder structure 404 that constitutes the main structure of the second stage cyclone separation unit, and a detachable dust collection chamber lid 405a.

When assembling, the two-stage separation cylinder structure 404 is placed into the second housing 403 from an open mouth 406 at the first end of the second housing 403, the first housing 402 is connected to the second housing 403, the air inlet 400 of the structure body 401 passes through an opening 407 on the first housing 402 and is butted up against an interface 408 of the two-stage separation cylinder structure 404, and a sealing cap 409 of the structure body 401 is used for closing the opening 407 on the first housing 402 and the dust collection chamber lid 405a is mounted to an open mouth 410 at the second end of the second housing 403. For the sake of clarity, FIG. 5 does not illustrate such a structure that is mounted at the open mouth 406 of the second housing 403 and achieves the closing function and the function of holding the air outlet unit.

Figure 6:
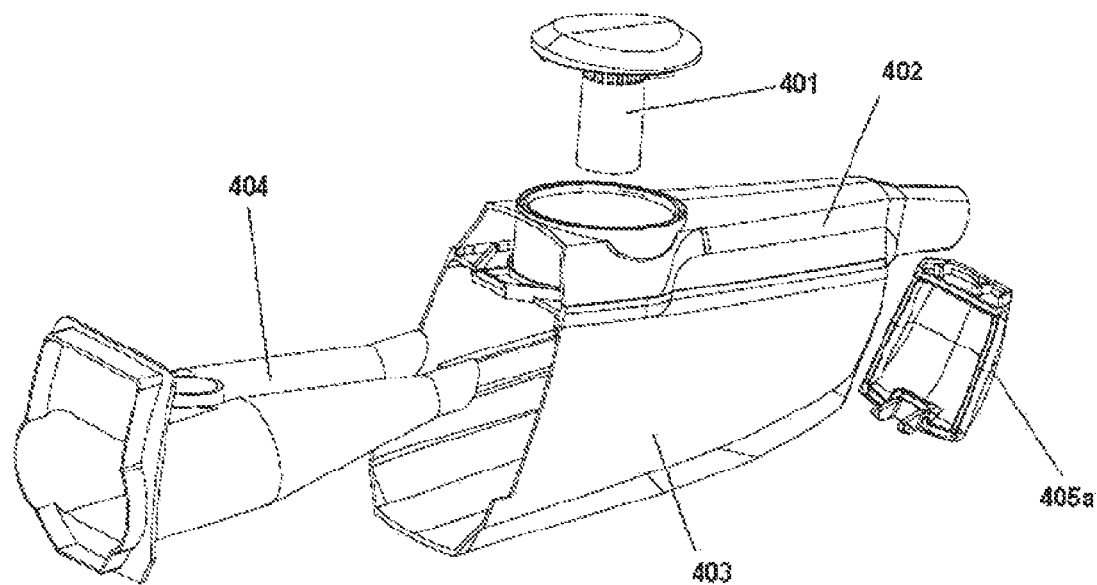
FIG. 6 illustrates the assembling process of the two-stage cyclone dust separator shown in FIG. 5.
Figure 7:
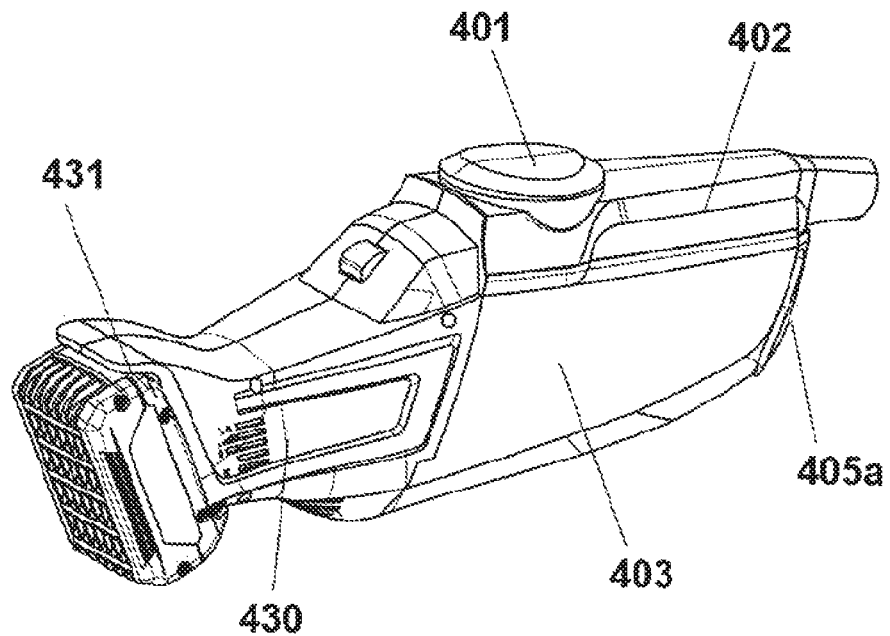
FIG. 7 is a three-dimensional view of the assembled two-stage cyclone dust separator.
Figure 8:
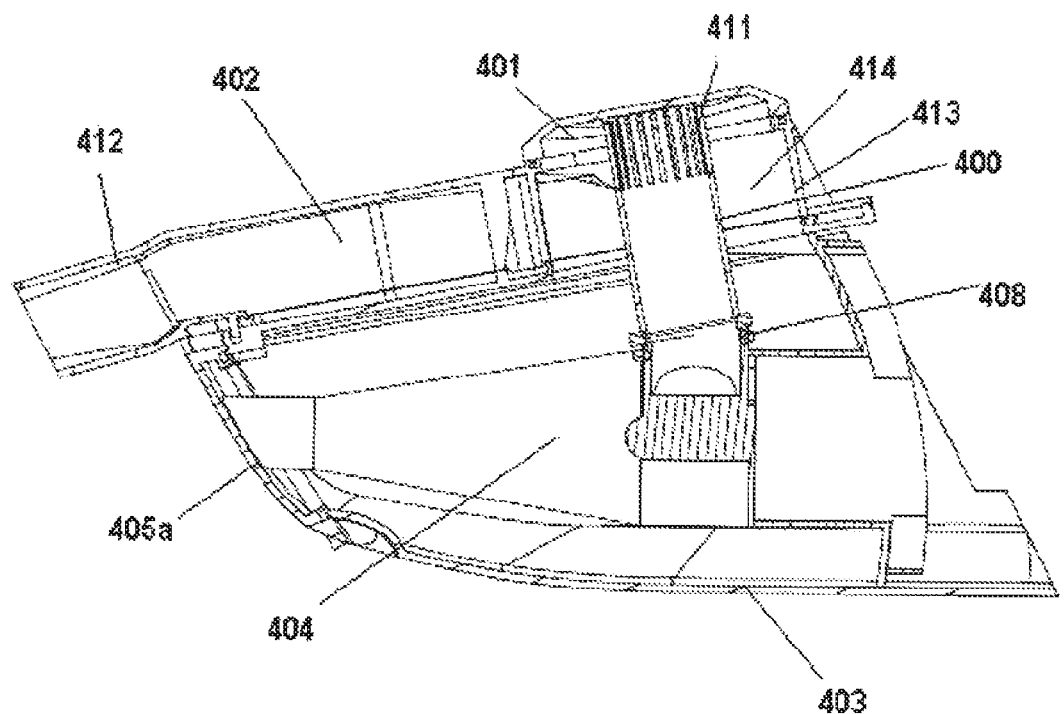
FIGS. 8, 9, and 10 respectively are a sectional view, a top view and a left-side view of the assembled two-stage cyclone dust separator.
Figure 9:
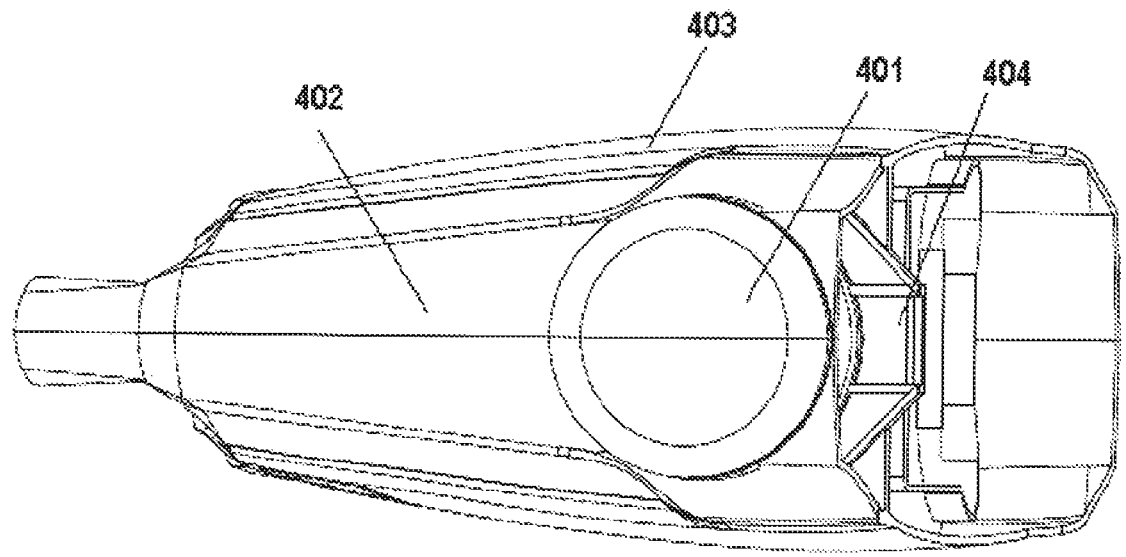
Figure 10:
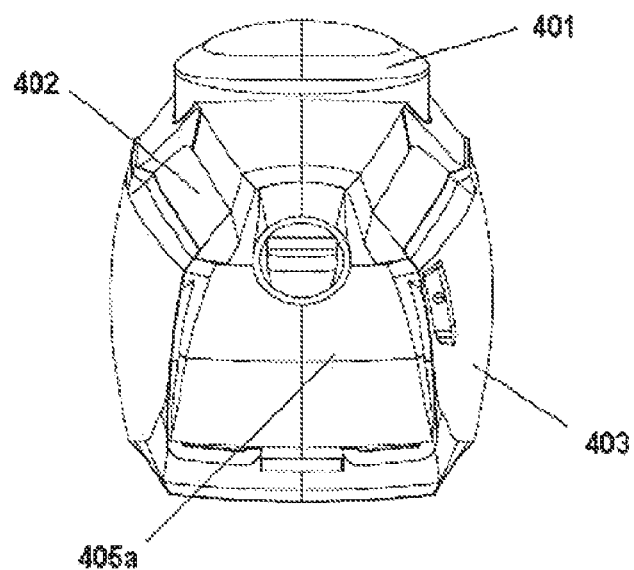

FIG. 6 illustrates the assembling process more clearly. FIG. 7 is a three-dimensional view of the well-assembled portable cyclone dust separator, and after the two-stage separation cylinder structure 404 of the portable cyclone dust separator is fitted into the portable cyclone dust separator from the open mouth 406, a negative pressure generator 430 (containing a battery pack) is fitted into the two-stage separation cylinder structure 404. At the same time, a handle portion 431 also is integrally provided on the negative pressure generator 430. FIGS. 8, 9, and 10 are a sectional view, a top view and a left-side view of the assembled portable cyclone dust separator corresponding to FIG. 6, respectively.

As describe above, the structure body 401 has the air inlet 400 and the sealing cap 409, and the air inlet 400 preferably is tubular and is provided with a plurality of air-in holes 411 on the circumference adjacent to the sealing cap 409, which air-in holes preferably are strip-like and preferably are evenly arranged around the circumference.

The first housing 402 is provided thereon with a first structure 412 forming the intake passage and a first stage cyclone cylinder 413. As shown in FIG. 8, in the assembled state the air inlet 400 projects into the first stage cyclone cylinder 413 generally centrally, and one end of the first stage cyclone cylinder 413 sealingly abuts against the corresponding place of the second housing 403 and is in communication with the inner chamber of the second housing 403, so as to define a first stage cyclone chamber 414 therebetween. That is, the portable cyclone dust separator comprises the opening 407 that opens in the direction of the first rotational axis 305, and the open mouth 406 that opens in the direction of the second rotational axis 306, the two-stage separation cylinder structure 404 is fitted into the portable cyclone dust separator from the open mouth 406, and the air inlet 400 is fitted into the portable cyclone dust separator from the opening 407 and is in built-in communication with the two-stage separation cylinder structure 404.

As describe above, in the assembled state, the end of the air inlet 400 away from the sealing cap 409 is butted up against the interface 408 of the two-stage separation cylinder structure 404, so as to tangentially direct the part air with fewer and finer dust into the second stage cyclone separation unit.

Figure 11:
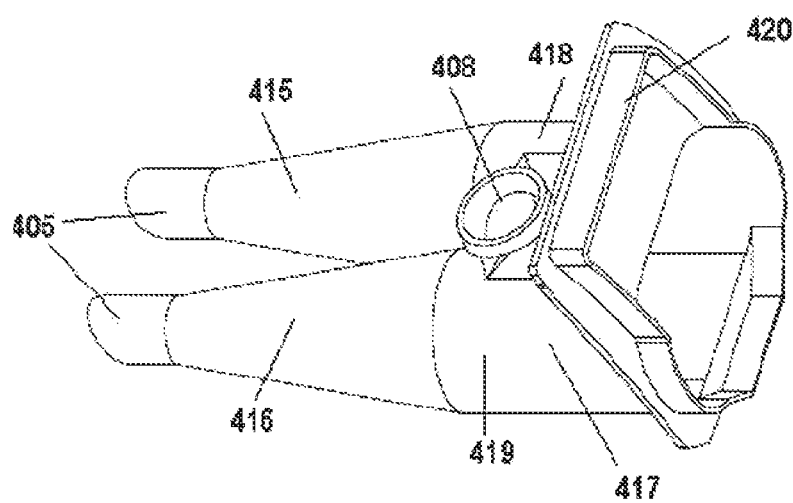
FIG. 11 is a three-dimensional view of the two-stage separation cylinder structure of the two-stage cyclone dust separator shown in FIG. 5.

FIG. 11 is a three-dimensional view of the two-stage separation cylinder structure 404. As shown in FIG. 11, the two-stage separation cylinder structure 404 comprises two generally parallel second stage cyclone cylinders, i.e., a first cyclonic conical drum 415 and a second cyclonic conical drum 416, which share one chamber body 417. Both the greater ends of the first cyclonic conical drum 415 and the second cyclonic conical drum 416 communicate with the chamber body 417, and their smaller ends both extend into the second dust collection chambers 405 in the assembled state. The chamber body 417 is preferably comprised of a first partial cylinder 418 and a second partial cylinder 419. An interface 408 leading to the chamber body 417 is formed at the junction of the first partial cylinder 418 and the second partial cylinder 419. The interface 408 can tangentially introduce the air into the first partial cylinder 418 and the second partial cylinder 419 simultaneously, so that the air can rotate at high speed in the opposite directions within the first partial cylinder 418 and the second partial cylinder 419 and enter the corresponding first cyclonic conical drum 415 and the second cyclonic conical drum 416, and finally transfer the separated dust to the second dust collection chambers 405.

In order to stably hold the two-stage separation cylinder structure 404 in the second housing 403, it is possible to arrange a support 420 at one side of the chamber body 417, which support 420 can be matchingly supported in the second housing 403 in the assembled state so as to maintain the two-stage separation cylinder structure 404 in a stable state.

Referring again to FIG. 5, provided at the junction of the second housing 403 and the first housing 402 is a groove 421 that constitutes the other part of the intake passage and cooperates with the first structure 412, and the first structure 412 and the groove 421 collectively constitute the intake passage so as to tangentially introduce into the first stage cyclone chamber 414 the air with the dust that needs to be purified.

Figure 12:
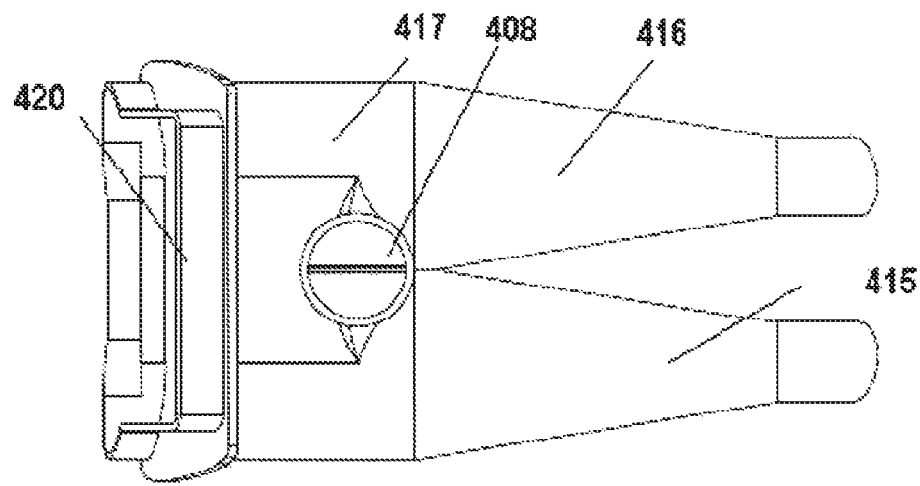
FIGS. 12 and 13 are a top view and a side view of the two-stage separation cylinder structure shown in FIG. 11, respectively.
Figure 13:
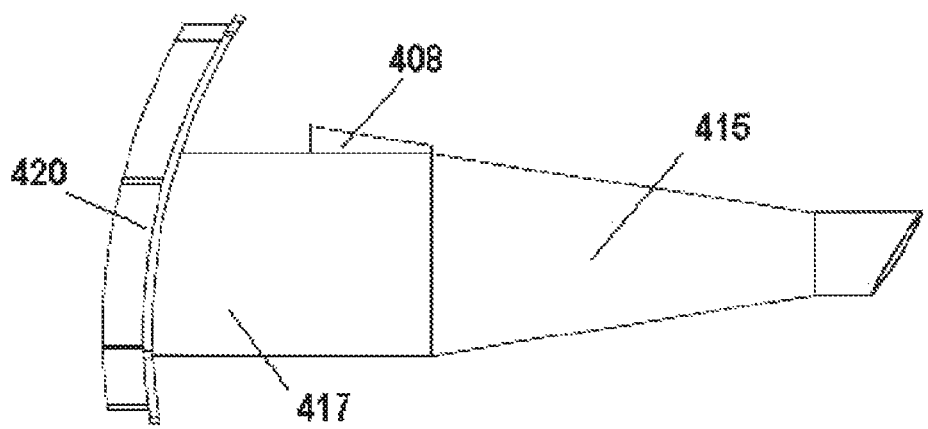

For the sake of clarity, FIGS. 12 and 13 are a top view and a side view of the two-stage separation cylinder structure 404, respectively.

In addition, preferably, the structure body 401, the first housing 402, the second housing 403, the two-stage separation cylinder structure 404 and the second dust collection chambers 405 are assembled in a snap-fit connecting mode.

The above embodiments have the advantages of simple structure, convenient assembling, and being easy to machine and manufacture, and especially when the dust collection chamber lid 405a is detached, not only the dust within the second dust collection chambers 405 can be removed, but also it is possible to dump the dust in the second housing 403.

To sum up, the present invention in general provides a portable cyclone dust separator, comprising: a first stage cyclone separation unit 100, which has an intake for suctioning air to be dedusted, a first stage cyclone cylinder 102 that rotates the air suctioned through the intake around a first rotational axis 305, and a first dust collection chamber 103 that collects the dust separated by the first stage cyclone cylinder 102; and a second stage cyclone separation unit 200, which has an air inlet 201 that suctions from the first stage cyclone separation unit 100 the air that needs to be dedusted secondarily, a second stage cyclone cylinder 203 that rotates the air suctioned through the air inlet 201 around a second rotational axis 306, and a second dust collection chamber 202 that collects the dust separated by the second stage cyclone cylinder 203, wherein the first rotational axis 305 is disposed to be nonparallel to the second rotational axis 306. In order to be adapted to the greater using angle, it is preferred that the angle included by the first rotational axis 305 and the second rotational axis 306 ranges from 60° to 90°. At the same time, in order to obtain the miniaturized and compactor dust separator, the second stage cyclone cylinder 203 is accommodated within the first dust collection chamber 103, and the air inlet 201 communicates with second stage cyclone cylinder 203 and extends to the middle of the first stage cyclone cylinder 102. Further, both the air inlet 201 and the first stage cyclone cylinder 102 are cylindrical and are concentrically disposed, so as to provide the more stable intake airflow for the second stage cyclone cylinder 203. The design that the dust collection chamber lid opens and closes the first dust collection chamber and the second dust collection chamber simultaneously also further optimize the dust processing time and the using convenience.

The basic concept of the present invention is that the portable cyclone dust separator can be fit for the operating orientations within the greater angular range so as to ensure the consistent high working efficiency and lasting normal working duration, by causing the cyclone axis of the first stage cyclone separation unit and the cyclone axis of the second stage cyclone separation unit to be not disposed in the same direction, but disposed in an intersecting manner (exhibiting an included angle ranging from 60° to 90°), preferably disposed vertically to each other.

For one skilled in the art, other advantages and alternative embodiments of the present invention are obvious. The present invention in term of the broader sense therefore is not limited to the described and illustrated details, representative structures and exemplary embodiments. Instead, one skilled in the art can make the various modifications and replacements without departing from the basic spirit and scope of the present invention.

The invention claimed is:
1. A portable cyclone dust separator comprising:
a first stage cyclone separation unit having an intake for suctioning air to be dedusted, the air suctioned through the intake rotating around a first rotational axis in the first stage cyclone separation unit; and a second stage cyclone separation unit having an air inlet, the air inlet being configured to be adapted to suction the air, which needs to be dedusted secondarily by the second stage cyclone separation unit, from the first stage cyclone separation unit, the air suctioned through the air inlet rotating around at least one second rotational axis in the second stage cyclone separation unit, wherein the first rotational axis is disposed to be nonparallel to the second rotational axis, wherein:
the second stage cyclone separation unit has at least one second stage cyclone structure,
the second stage cyclone separation unit further comprises an air outlet unit that coaxially extends into the second stage cyclone structure,
the first stage cyclone separation unit has a first stage cyclone structure, the intake is configured to be adapted to tangentially direct the air to be dedusted into the first stage cyclone structure,
the second stage cyclone separation unit has at least one second stage cyclone cylinder, a larger end of which is connected to the corresponding second stage cyclone structure;
the second stage cyclone structure is configured to be adapted to generate a rotating airflow in the corresponding second stage cyclone cylinder; and
a prefilter is arranged in the intake.

2. A portable cyclone dust separator comprising:
first stage cyclone separation unit having an intake for suctioning air to be dedusted, the air suctioned through the intake rotating around a first rotational axis in the first stage cyclone separation unit; and
a second stage cyclone separation unit having an air inlet, the air inlet being configured to be adapted to suction the air, which needs to be dedusted secondarily by the second stage cyclone separation unit, from the first stage cyclone separation unit, the air suctioned through the air inlet rotating around at least one second rotational axis in the second stage cyclone separation unit, wherein the first rotational axis is disposed to be nonparallel to the second rotational axis,
wherein:
the first stage cyclone separation unit has a first stage cyclone structure, the intake is configured to be adapted to tangentially direct the air to be dedusted into the first stage cyclone structure,
the second stage cyclone separation unit has at least one second stage cyclone structure,
the second stage cyclone separation unit has at least one second stage cyclone cylinder, a larger end of which is connected to the corresponding second stage cyclone structure,
the second stage cyclone structure is configured to be adapted to generate a rotating airflow in the corresponding second stage cyclone cylinder, and
a prefilter is arranged in the intake,
the first stage cyclone separation unit further comprises a first dust collection chamber connected to the first stage cyclone structure,
the second stage cyclone separation unit further comprises an air outlet unit that coaxially extends into the second stage cyclone structure,
the intake is a suction tube, and
one end of the air inlet has an axial opening adapted to suction the air.

3. The portable cyclone dust separator as recited in claim 2, wherein:
an end of the second stage cyclone structure away from the second stage cyclone cylinder is covered by a lid, a central hole is disposed at a center of the lid, and the air outlet unit passes through the central hole into the second stage cyclone structure.

4. A portable cyclone dust separator comprising:
a first stage cyclone separation unit having an intake for suctioning air to be dedusted, the air suctioned through the intake rotating around a first rotational axis in the first stage cyclone separation unit; and
a second stage cyclone separation unit having an air inlet, the air inlet being configured to be adapted to suction the air, which needs to be dedusted secondarily by the second stage cyclone separation unit, from the first stage cyclone separation unit, the air suctioned through the air inlet rotating around at least one second rotational axis in the second stage cyclone separation unit, wherein the first rotational axis is disposed to be nonparallel to the second rotational axis,
wherein the first stage cyclone separation unit and the second stage cyclone separation unit are at least partially embodied by a structure body having the air inlet, a first housing, a second housing, a two-stage separation cylinder structure and a dust collection chamber lid, wherein in the assembled state, the first housing is connected to the second housing, the two-stage separation cylinder structure is fixed in the second housing, the structure body is secured to the first housing such that the air inlet extends into the two-stage separation cylinder structure, and the dust collection chamber lid is detachably connected to the second housing.

5. The portable cyclone dust separator as recited in claim 4, wherein:
the two-stage separation cylinder structure has a first cyclonic conical drum, a second cyclonic conical drum and a chamber body, wherein the first cyclonic conical drum runs generally parallel to the second cyclonic conical drum, larger ends of the first cyclonic conical drum and the second cyclonic conical drum both communicate with the chamber body, smaller ends of the first cyclonic conical drum and the second cyclonic conical drum both extend into a second dust collection chamber in the assembled state, the chamber body comprises a first partial cylinder and a second partial cylinder, a junction between the first partial cylinder and the second partial cylinder is provided with an interface leading to an interior of the chamber body, which interface is in the assembled state in communication with the air inlet such that the air can be tangentially guided into the first cyclonic conical drum and the second cyclonic conical drum simultaneously;
the structure body is further provided with a sealing cap attached to the air inlet, the first housing is provided with a first stage cyclone cylinder that is opened at both ends, in the assembled state a first end of the first stage cyclone cylinder is closed by the sealing cap, and a second end of the first stage cyclone cylinder opposite the first end sealingly abuts against a corresponding place of the second housing and is in communication with an inner chamber of the second housing;
the intake comprises a first portion arranged on the first housing and a second portion arranged on the second housing and mating with the first portion;
the second housing has a first open mouth and a second open mouth opposite the first open mouth, the dust collection chamber lid is detachably connected to the first open mouth and closes the first open mouth, the two-stage separation cylinder structure is fitted into the second housing through the second open mouth;

the two-stage separation cylinder structure is provided with a support which is adapted to at least auxiliary fix the two-stage separation cylinder stably in the second housing;

the second housing acts as the first dust collection chamber of the first stage cyclone separation unit, and is configured to allow removal of the dust in the second housing by detaching the dust collection chamber lid; and at least two of the structure body, the first housing, the second housing, the two-stage separation cylinder structure and the dust collection chamber lid are assembled together in a snap-fit connecting mode.

6. The portable cyclone dust separator as recited in claim 5, wherein:

the air inlet is configured to be tubular and is provided, at a position adjacent to the sealing cap, with a plurality of air-in holes distributed about the circumference;

the first stage cyclone cylinder is cylindrical;

the air inlet is arranged concentrically with the first stage cyclone cylinder; and the first open mouth is smaller than the second open mouth.

7. The portable cyclone dust separator, comprising:

a first stage cyclone separation unit including an intake fix suctioning air to be dedusted;

a first stage cyclone cylinder for causing the air suctioned through the intake to rotate around a first rotational axis;

a first dust collection chamber for collecting dust separated by the first stage cyclone cylinder; and a second stage cyclone separation unit including an air inlet for suctioning the air that needs to be secondarily dedusted from the first stage cyclone separation unit, a second stage cyclone cylinder for causing the air suctioned through the air inlet to rotate around a second rotational axis, and a second dust collection chamber for collecting dust separated by the second stage cyclone cylinder, wherein the first rotational axis is disposed to be nonparallel to the second rotational axis, wherein the second stage cyclone cylinder is received within the first dust collection chamber, and the air inlet is in communication with the second stage cyclone cylinder and extends to the middle of the first stage cyclone cylinder.

8. The portable cyclone dust separator as recited in claim 7, wherein both the air inlet and the first stage cyclone cylinder are cylindrical and are concentrically arranged.

9. The portable cyclone dust separator as recited in claim 8, wherein the portable cyclone dust separator further comprises a dust collection chamber lid adapted to open and close the first dust collection chamber and the second dust collection chamber simultaneously.

10. The portable cyclone dust separator as recited in claim 8, wherein the portable cyclone dust separator comprises an opening that is opened in the direction of the first rotational axis and an open mouth that opens in the direction of the second rotational axis, the second stage cyclone cylinder is fitted into the portable cyclone dust separator from the open mouth, and the air inlet is fitted into the portable cyclone dust separator from the opening and communicates with the second stage cyclone cylinder.

11. The portable cyclone dust separator as recited in claim 10, wherein the second stage cyclone separation unit comprises at least two second stage cyclone cylinders that are parallel to each other and communicate with the air inlet.

* * * * *